United States Patent [19]

Finn

[11] Patent Number: 5,700,687
[45] Date of Patent: Dec. 23, 1997

[54] ODOR CONTROL SYSTEM

[75] Inventor: Larry J. Finn, Gladewater, Tex.

[73] Assignee: Bedminster Bioconversion Corporation, Marietta, Ga.

[21] Appl. No.: 660,165

[22] Filed: Jun. 3, 1996

Related U.S. Application Data

[62] Division of Ser. No. 379,896, Jan. 30, 1995, Pat. No. 5,583,045.

[51] Int. Cl.$^6$ ............................... A61L 9/01; C12M 3/00; C05F 11/08

[52] U.S. Cl. .................. 435/266; 435/290.1; 435/290.2; 34/360; 34/582; 34/583; 71/8; 71/9; 71/12; 71/14; 422/5; 422/120

[58] Field of Search ............... 435/289.1, 290.1, 435/290.2, 266; 34/360, 582–585; 71/8, 9, 11, 12, 14, 15; 422/5, 120, 122

[56] References Cited

U.S. PATENT DOCUMENTS 2,608,474  8/1952  Gilliam ................................ 210/293
3,653,845  4/1972  Moravec .............................. 210/293

*Primary Examiner*—David A. Redding
*Attorney, Agent, or Firm*—Stanley H. Zeyher

[57] ABSTRACT

A compost curing and odor control system in which biofilters are disposed in overlying relation to the compost curing area the floors of both the biofilters and curing area consist of a series of elongated planks of generally trapezoidal cross sectional configuration placed in abutting relation with the longer parallel sides of the trapezoid lying in the plane of the floor and forming between them a narrow slit through which air is passed by means of an underlying air plenum in pneumatic communication.

6 Claims, 5 Drawing Sheets

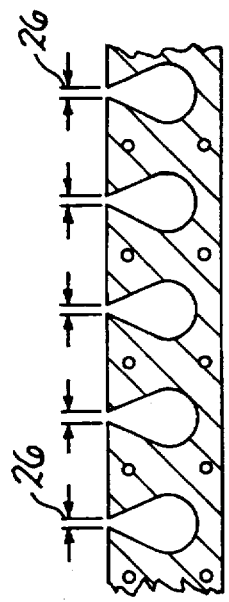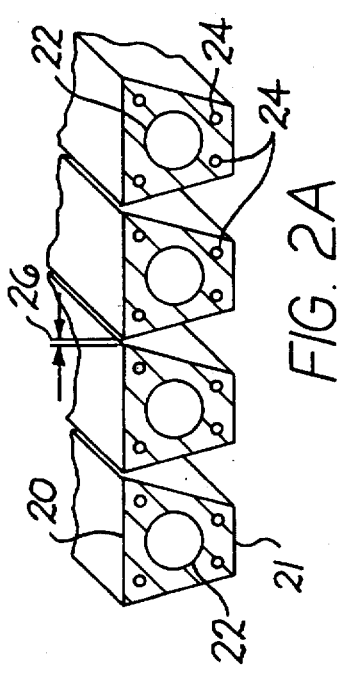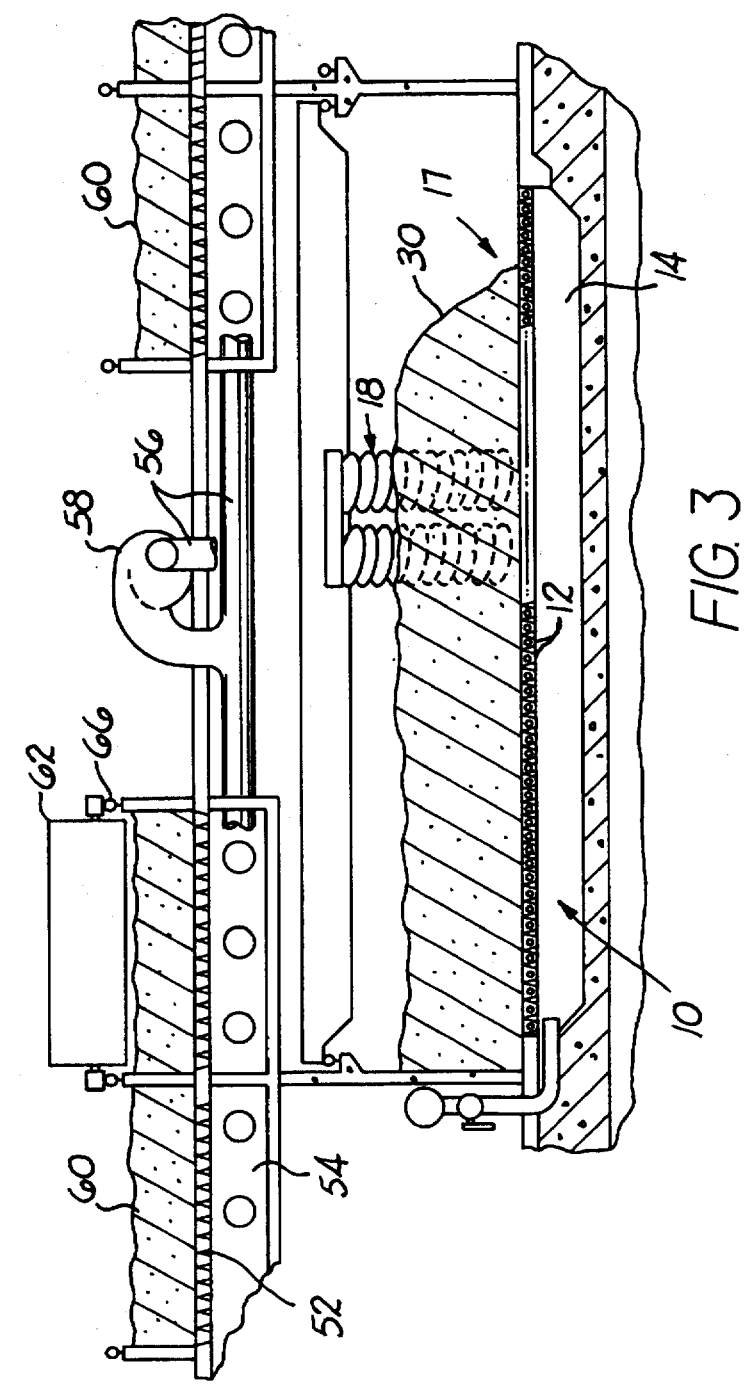

ODOR CONTROL SYSTEM

This application is a division of application Ser. No. 08/379,896, filed Jan. 30, 1995, now U.S. Pat. No. 5,583,045.

FIELD OF THE INVENTION

This invention relates to a method and apparatus for curing compost and for deodorizing effluent gases emanating from the curing process. More specifically the invention is directed to a unique air-floor design and method of operation which improves and accelerates both the curing and deodorizing phases of the process as well as providing a unique water management system.

BACKGROUND OF THE INVENTION

Prior art systems for curing compost commonly utilize a concrete floor containing rectangular trenches in which is laid perforated pipe the ends of which are supplied air from a common plenum. The pipes are overlaid with a metal or plastic grating or gravel distribution system to permit front end loaders to traverse the floor to turn the compost periodically. A major problem of such systems is non-uniform air distribution resulting in unreliable curing of the compost. Another problem normally encountered in the use of such systems is clogging of the floor air vents necessitating shut down of the system until the vents have been cleared. A concomitant problem that results as the vents become clogged is that pressure required to maintain desired air flow increases. Consequently, blowers of increased capacity are needed to insure optimum curing conditions to offset the effects of variable back pressure caused by clogging of the air vents. The above problems result in unproductive down time with attendant increase in the cost of operation. The present invention ameliorates these problems. It is also to be noted that through use of the subject apparatus and method of operation the maintenance and effectiveness of the curing process is materially enhanced. The air channels are more easily accessed and cleaned and the overall costs of the curing system substantially reduced. Another aspect of the invention is the unique positioning of the system elements. Important factors in the siting of compost curing systems are the proximity of the system to populated areas and the required land area needed for operations. By positioning the biofilters in overlying relation to the curing floor as herein taught by applicant two major objectives are achieved. First, the area required for operations is reduced and secondly the filtering system is positioned to insure that effluents from the biofilter are emitted at higher elevations insuring that there is greater dispersion of effluent upon its release into the atmosphere. There is also provided a novel system for effecting dispersion of effluents during atmospheric inversions and for retaining and conserving water.

SUMMARY OF THE INVENTION

Central to one phase of the invention is the provision of a unique floor design. The aeration bay is comprised of a series of structural concrete elements each having a generally trapezoidal cross section. The elements are placed in abutting relation with the longer parallel side of the trapezoid lying in the plane of the upper surface of the air-floor. The end of each element rests on a concrete beam. This arrangement provides for a very thin point of contact between adjacent elements. To create a narrow slit through which air can pass a thin rotary saw blade or rake is passed along the point of contact. The slit is narrow enough to prevent compost stacked on the floor from falling through the slits. Underlying the floor are a series of air plenums which are supplied air from a common manifold. Such an arrangement provides uniform distribution of air throughout the system and is substantially clog free. The system is easily maintained without interrupting the curing process. It has been discovered that by employing a similar type of floor construction as an element of a biofiltering system similar advantages accrue. Additionally, through use of vertical stacking of the curing and air filtering components, a more economic and efficacious curing and air purification system is achieved. To optimize operation of the biological systems the air plenums are converted to oxidation ditches or ponds by partially filling the plenum with collected water and conveying leachate from the biofiltering and compost curing units to the aeration plenums. This procedure inoculates the water with microbial cultures which are then selectively sprayed on both the compost piles undergoing curing and the biofilter media. Additionally, by using the roof as a collection device for rain water and plenums as water storage sites a unique water management system is achieved.

BRIEF DESCRIPTION OF THE DRAWINGS

The above described and other features of the invention will be more fully understood by reference to the detailed discussion of the invention hereinafter set forth taken in conjunction with the accompanying drawings, in which;

FIGS. 2A and 2B depict cross-sectional details of alternate floor plank designs;

FIG. 3 illustrates a compost aeration and odor control system using roof top biofilters;

DETAILED DESCRIPTION

Figure 1:
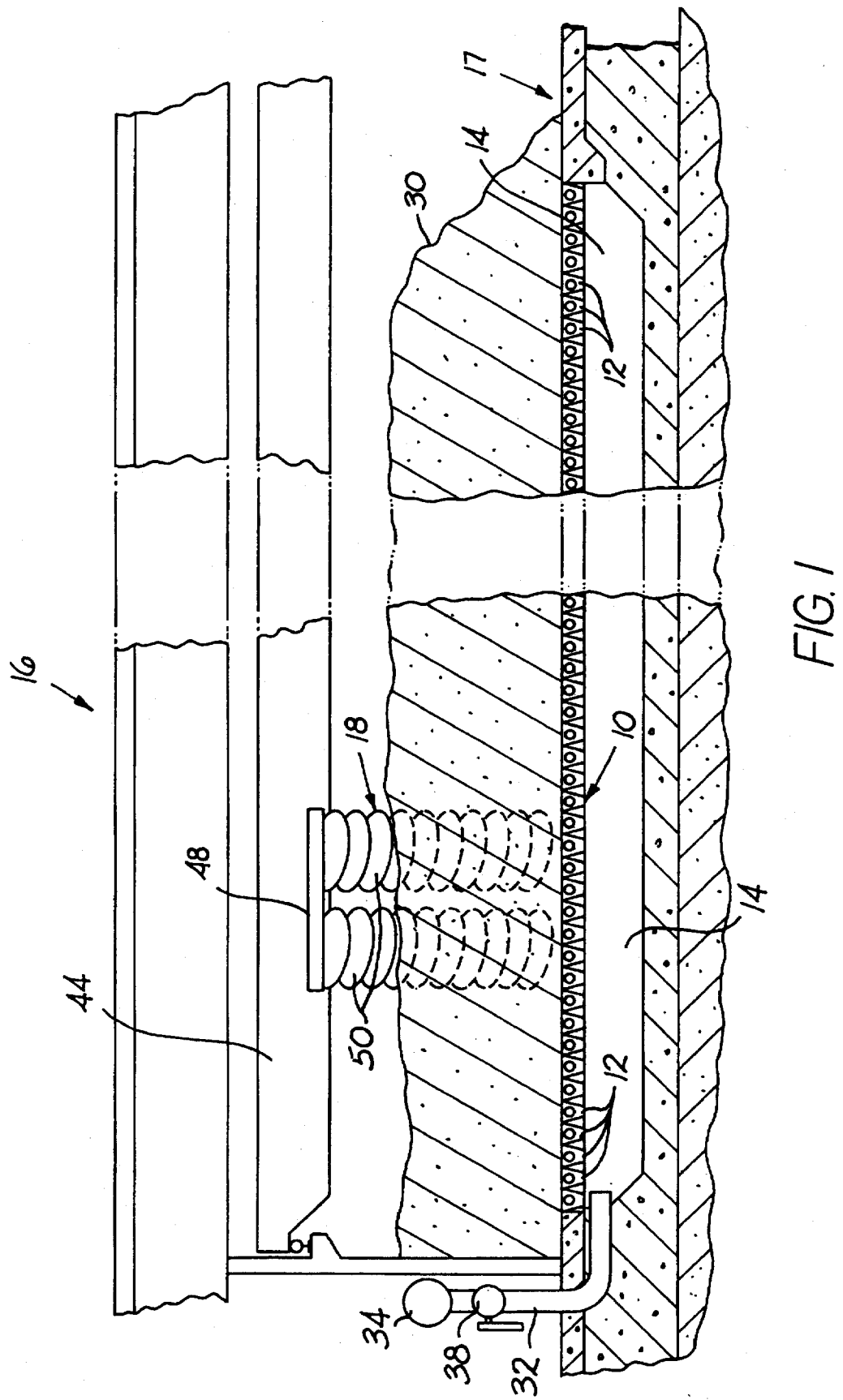
FIG. 1 is a side elevation of an aeration curing bay embodying one aspect of the present invention.

For purposes of illustrating the invention, there is shown in the drawings a form which is. presently preferred; it being understood, however, that this invention is not limited to the precise arrangements and instrumentalities shown.

Current state-of-the-art systems for achieving composting of solid waste and sewage sludge employ one or more multi-stage, horizontally disposed digesters in which materials being treated undergo staged microbial decomposition. The digester comprises a tube-like structure divided into two or more compartments or stages. During material processing the tube is rotated while air is circulated through the digester at controlled rates under predetermined conditions in a flow direction counter to the material flow. The climate in each stage is maintained to achieve the optimum development of the type and species of microorganism predominant in that stage. Typical of such systems and methodology of operation are those set out and described in U.S. Pat. Nos. 3,245,759 and 3,138,447, assigned to the assignee of the present invention, the teachings of which are hereby incorporated by reference.

In a composting system utilizing a multi stage digester for the co-composting of municipal solid waste and sewage sludge the typical residence time in the digester is normally three days. Upon removal from the digester the material is comprised of partially cured compost and nondegradeables. The partially cured or rough compost is conveyed to an area in which further composting or curing is carried out. For purposes of this invention this phase of further processing of the partially cured compost will be referred to generically as curing. The term curing area as used herein shall mean an area in which partially cured compost is stabilized into a humus-like material. The curing stage of the composting process is an important and essential phase of the overall process. It is to this phase of the process, and the subsequent treatment of the processing air prior to its release to the atmosphere, that the present invention is primarily directed. However, it should be understood that teachings of this invention have broader application than the specific embodiments herein described and can be employed in the treatment of compostable material which has not undergone previous processing or in the deodorizing and treatment of gases from any of a number of different sources.

Referring now to the drawings and more particularly to FIG. 1 thereof, there is shown in cross sectional elevation an air floor and air supply system comprising a preferred form of aeration bay incorporating one aspect of the present invention. As seen in that Figure, the air floor 10 is comprised of a series of planks 12 made of concrete. Underlying the floor is an air plenum 14 made of concrete walls and underlain with high density polyethylene thirty to one hundred mills in thickness. To permit easy access to the plenum for maintenance purposes it is at least three feet in depth. The plenum underlies a curing area 16 which in the illustrated embodiment is twenty feet in width, (running perpendicular to the plane of the paper) and sixty feet long, a portion 17 of the area is kept clear of compost to provide a path for return of the compost turning mechanism 18 to its starting position. A preferred construction of the planks making up the air floor is shown in cross section in FIG. 2A. The FIG. 2A plank is 8" in thickness from top to bottom and has a trapezoidal cross section and a rectangular lower section. The top surface 20 is 10" to 12" wide and the bottom surface 21 is 8" to 10" in width. The concrete is set up around reinforcing steel 24 to provide the requisite structural strength. In constructing the air floor the planks are laid side by side in abutting relation as shown in FIG. 2A. At their contact point a slit 26, about 1/16 inch in width is formed using a saw or raking tool. This procedure is used to insure a controlled and uniform width of air slit. This unique construction insures uniform air distribution, an essential to efficient and effective curing while retaining the required structural strength to support compost stacked six to ten feet high on the air floor. Furthermore, these structural elements have sufficient strength to support a rubber-tired front-end loader when and if needed to move compost on the air floor. An alternative plank design capable of achieving the objective of uniform air distribution and structural strength is also available. In this embodiment the core 27 serves as an air conduit in communication with slits 28.

Figure 5:
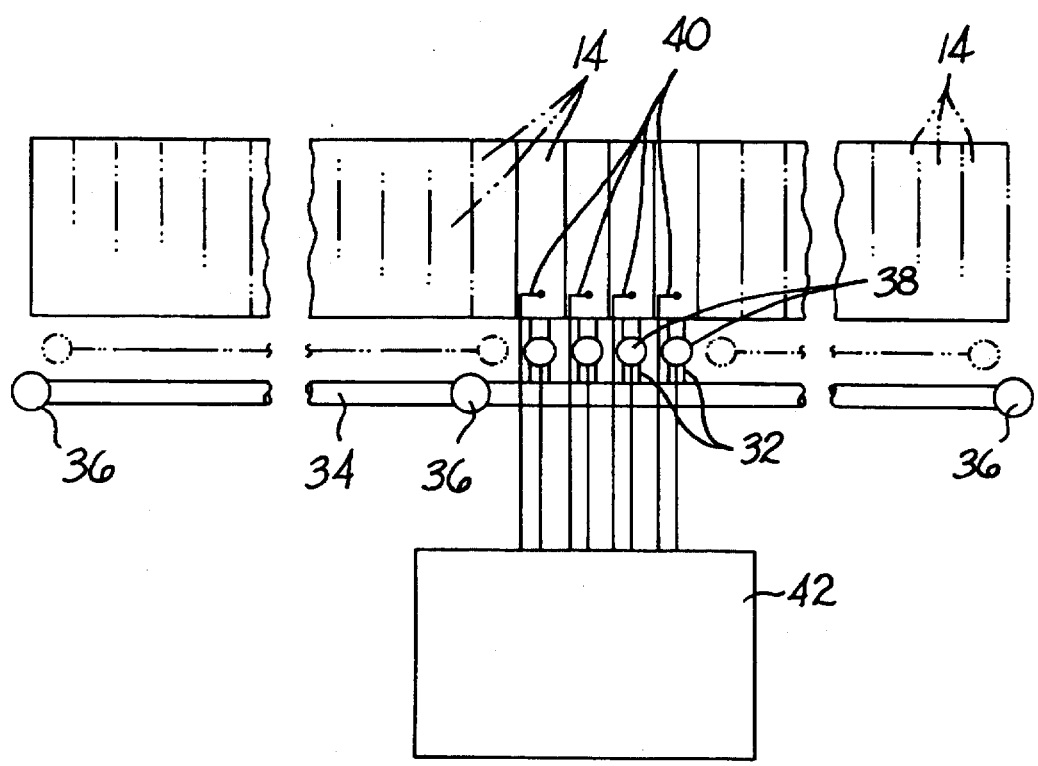
FIG. 5 is a diagrammatic plan view of the air plenum distribution network.

An aeration channel comprised of 30 curing bays 15 feet wide and 60 feet in depth in which compost is stacked 10 feet high can hold approximately 5000 tons of compost. Compost 30 to be cured is stacked on the curing floor. As seen in FIGS. 1 and 5 the air plenums 14 of the individual bays are each supplied air via 8" diameter pvc ducts 32 which in turn are connected to a 24" diameter pvc manifold 34 supplied air by fans 36 (FIG. 5). The requiste temperature for curing is between 55° to 65° C. degrees. To maintain the process within these parameters of operation each feeder line 32 is provided with a computer controlled air damper 38 to modulate air flow. Temperatures within each bay are monitored by means of temperature probes 40 located at strategic locations within the curing bay. To produce a desired air flow throughout each curing channel three fans are provided, one located at the middle and one at either end of the channel. It has been found that fans each having a capacity of 12,000 cfm provide proper conditions for aerobic biological decomposition given the above operating parameters. The diagrammatic plan view shown in FIG. 5 depicts the above arrangement. The entire system is under control of computer 42.

Each compost aeration bay utilizes a compost turning mechanism such as claimed and described in U.S. patent application entitled Compost Curing System, Ser. No. 08/235,970 filed May 5, 1994, assigned to the assignee of the present invention, the teachings of which are hereby incorporated by reference. As described in that application, the turning mechanism 18 (FIG. 1) is movably suspended in overhanging relation to the compost pile by means of a bridge crane mounted on a truss-like or beam structure 44. The crane is mounted for movement from front to back along the length of the pile and the turning mechanism is attached to a carrier 48 mounted for movement along the truss from side to side across the pile. The compost turner itself is of generally V-shaped configuration one leg of which is comprised of a paired set of counter rotating ribbon augers 50 and the opposite leg consists of a associated conveyor system (not shown). To permit use of the turner with compost piles of varying heights and to permit variable spacing between turned and unturned sections of a compost pile, the augers and conveyor system can be made pivotly adjustable relative to the support structure and to each other. Compost which has undergone curing in an aeration bay for approximately four weeks is moved out of the bay by the automatic turning apparatus.

Figure 4:
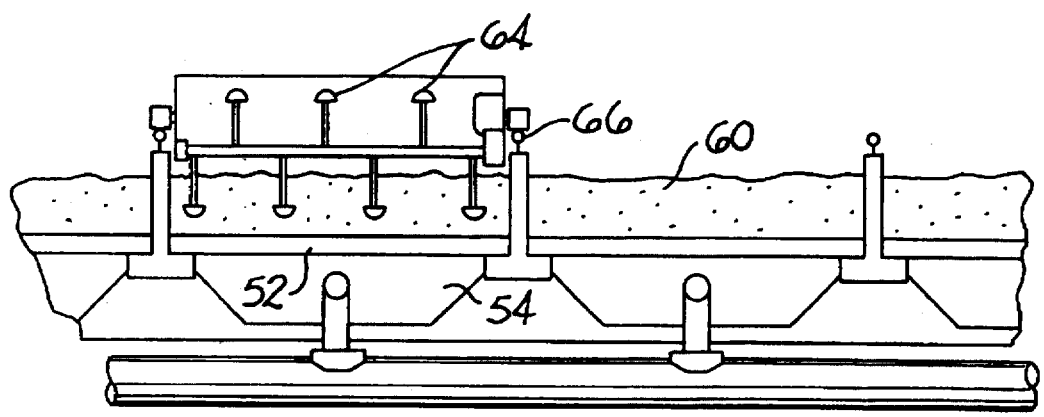
FIG. 4 is a side elevation showing details of the biofiltering system.

Referring now to FIG. 3 there is shown in cross sectional elevation a biofilter constructed in accordance with the present invention. The floor 52 is identical in construction to that used in the aeration curing floor shown in FIG. 1. It also has a plenum 54 similar to that used in the curing bay which underlies the biofilter floor. An alternate design would entail an air floor using planks as shown in FIG. 2B which would obviate the need for an air plenum. The plenum receives effluent gases emanating from the curing floor through ductwork 56 powered by a suction fan 58. The gases are passed through the biofilters to effect their deodorization. To insure effective deodorizing of the effluent gases the filtering media 60 is automatically and periodically turned and fluffed by turning machine 62. The turning machine is of conventional construction and comprises a series of paddles 64 mounted on a common shaft as seen in FIG. 4. The turner is carried by a dolly (not shown) moving on rails 66. It will be understood that biofilters of the type illustrated have wide application to the processing of effluents generally and are not restricted to the deodorizing of gases from the curing of compost derived from the co-composting of municipal solid waste and sewage sludge. Using an automatic turning machine in conjunction with this configuration allows for a continual, though periodic movement, of the biofilter media through the biofilter channels. The automatic turning of biofilter media allows for continuously restored media and provides an assured consistency of biofilter back pressure, media porosity and filtering capacity.

During traverse of a channel, the filtering media is moved between 6 to 8 feet toward the discharge end. At the end of each traverse the turning machine is moved onto a automatic transfer dolly (not shown) which positions it at the next channel to repeat the next cycle. The length of each channel is determined by the air treatment requirements of a particular application. Turning machines of this type are well known in the prior art.

As cured compost moves out of the curing bay it is screened to a fine gradation. That portion which fails to pass through the screen is used to augment the biofiltering media 60 and is introduced into the biofiltering system at a location overlying the point at which compost is discharged from the aeration curing bay. By this method of operation the rawest emissions from the curing bay are filtered by the most mature and finely divided filtering media thereby achieving more effective filtration of the effluent gases.

The biofilter media is designed to move counter to the movement of compost on the aeration floor and is moved by turning apparatus 62 along and through the filtering bed over a period of approximately twelve weeks. At the discharge point of the biofiltering system the spent media is removed, the man made inerts are screened out, and balance reintroduced into the aeration curing cycle. By this technique the quantity of material ultimately sent to land fill is greatly reduced.

Figure 6:
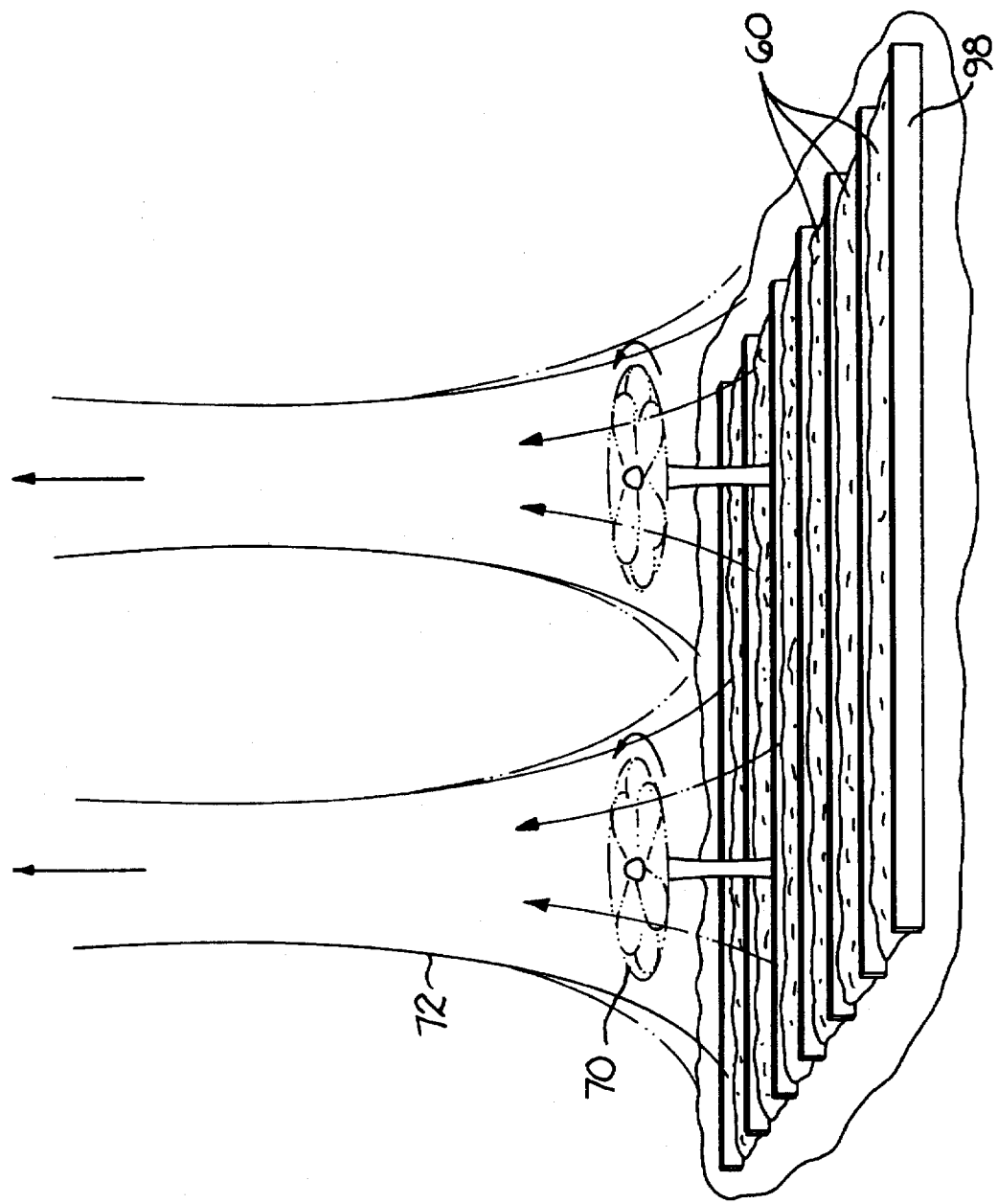
FIG. 6 depicts a biofilter exhaust system using wind machines.

In instances in which atmospheric air temperatures are layered, a condition known as thermal inversion occurs, where surface air is held down along with its pollutants. To counteract this problem, the novel arrangement shown in FIG. 6 is employed utilizing a wind machine 70. To increase the effectiveness of such an arrangement a venturi-shaped canopy 72 can be used to channel the air as shown in phantom in that Figure. The wind machine is capable of dispersing the filtered air at elevations as high as 700 feet, well above normal inversion levels, resulting in an environmentally acceptable operation under the most adverse conditions. To achieve the desired result, each 10,000 sq. ft. of biofilter surface has disposed over it an 18 ft diameter wind machine having an 850,000 cu.ft/min. output. The fan effects a ten to one dilution at the fan blade and pushes diluted air through the inversion layer to an altitude of about 700 feet. Wind velocities obtained in the system are in the 40 to 50 mile per hour range at the face of the fan. To achieve even higher velocities and efficiencies a venturi construction can be employed. Dispersion of effluents using roof top biofilters is normally satisfactory until there is an atmospheric temperature inversion. At this point the fans can be phased into use diluting the odor and pushing it through the inversion layer for further dilution and dispersion. A shroud or fabric enclosure over the biofilter area can be used to insure capture of all effluent gases.

Figure 7:
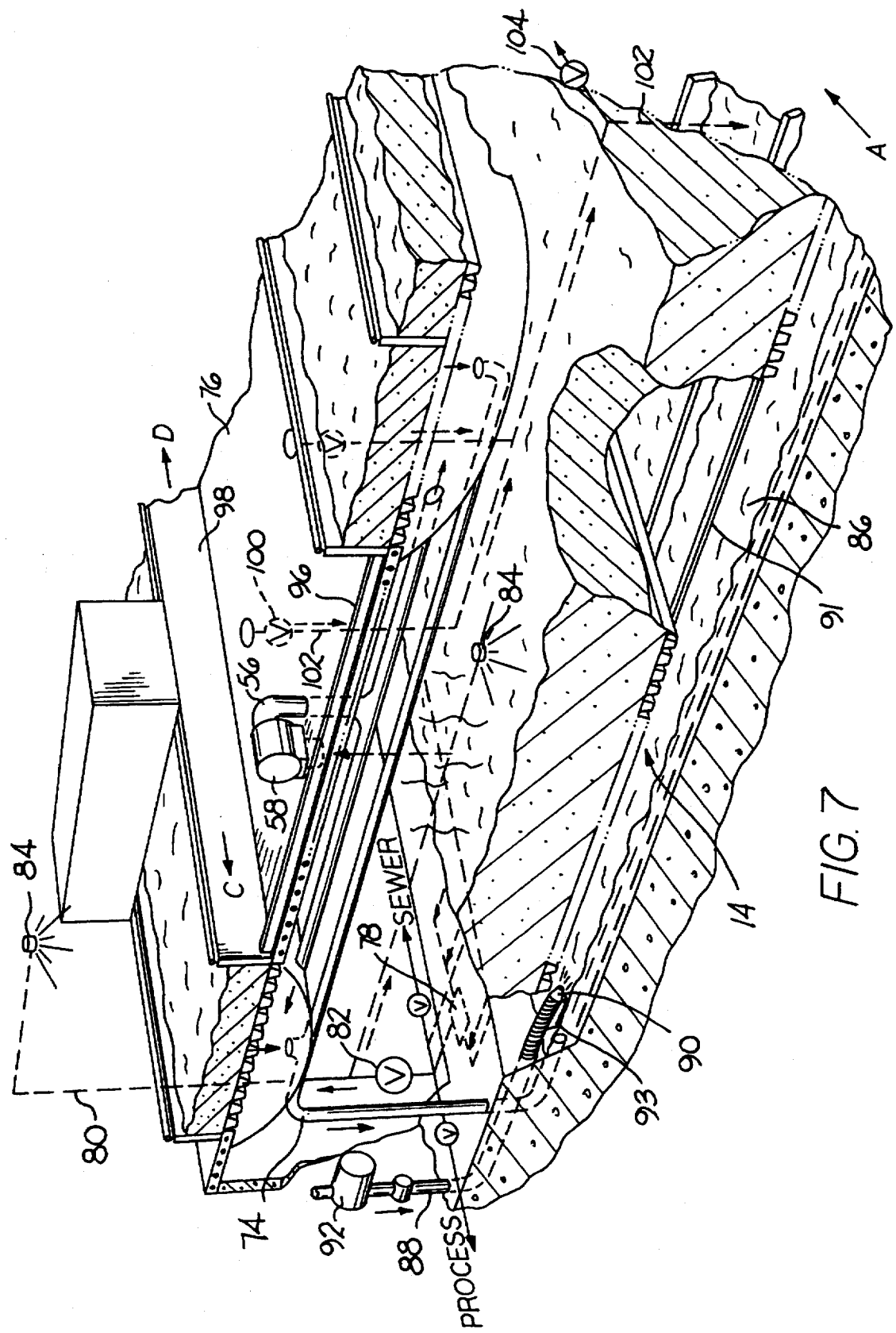
FIG. 7 is an isometric view showing the water retention and conservation system and the microbial reinoculation arrangement achieved through practice of the present invention.

A still further feature of the invention, as depicted in FIG. 7, is the provision of a water management system which enhances and accelerates the curing process, reduces or eliminates liquid effluents from the composting system and the need to buy water from off site, conserves water and also enables the operation to meet local storm water retention requirements. Leachate from the biofilters and the compost undergoing curing on the aeration floor is collected and stored within the underlying plenums. By this process, leachate which otherwise might migrate into the ground water, is collected and reintroduced into the composting process. Leachate from the biofiltering media is piped by ductwork 74 to the aeration bay plenums 14 where it is mixed with rain water collected from the roof 76 to form an oxidation pond using microbial cultures for treatment and purification. The cultures now in solution form are conveyed by pump 78, piping 80 and valving 82 to spray heads 84 to irrigate both compost undergoing curing and the biofiltering media. This procedure aids and accelerates the ongoing biological process. Water 86 within the plenums is warmed by process air blown into the plenums via ductwork 88. Nozzles 90 are employed to agitate and cause movement of water around a partition 91 centrally disposed within the plenum. This action both heats and agitates the water to enhance microbial growth and prevent water stagnation.

As noted above, the plenums underlying the aeration curing floor act as oxidation ditches or ponds and serve as incubating chambers for the growth of microbial cultures, which can then be used to reinoculate the biofilter media and compost. Air is passed through and is blown by fans (not shown) over the leachate solution within the plenum to both heat the solution and induce a mild current. The air nozzle 90 within the plenum is flexibly supported on a float 93 carried on the surface of the solution. Microbial cultures grown in the oxidation ditch are sprayed over the compost and filtering media, as needed, through use of spray heads 84. The roof or deck 76 is provided with a walled section 96 at both ends which along with walls 98 on which the biofilter turning apparatus rides form a water collection area. To insure the roofs water retention capabilities it can be covered by a waterproof single membrane roofing material such as high density polyethylene.

Rain water falling on the roof may be either directed to storm water facilities or diverted by means of valving 100 and associated plumbing 102, schematically illustrated in FIG. 7, to plenums 14 underlying the aeration floor. An assembly as previously described comprised of 30 aeration bays each having a plenum 15' wide by 60' long and 3-6 feet in depth can hold over a million gallons of water. In situations in which there is an excess of rain water as might occur in Florida during the summer months water can be diverted by valving 104 off-site.

In summary, use of the novel floor design herein described in both the aeration and biofilter systems provides uniform and predictable air flow distribution, a necessary and heretofore unattainable objective in the efficient and economical curing and deodorizing of compost. Additionally, the novel positioning of the biofilters in overlying relation to the aeration floor conserves space and results in greater dispersion of air emissions into the atmosphere. This direct coupled arrangement allows for the elimination of all air flow ducts thus cutting head losses in such piping and cutting the costs of biofilter operations. This arrangement also conserves aeration floor heat, a factor especially important in cold climates to keep biofilter media from freezing. Finally, by utilizing the roof structure and air floor plenums as reservoirs and oxidation ponds a novel water management and compost and biofilter media reinoculation system is provided.

It will be understood that structural and dimensional modifications differing from those described and illustrated will be required to meet varying circumstances and that the present invention may be embodied in other specific forms without departing from the spirit or essential attributes thereof and, accordingly, reference should be made to the appended claims rather than to the foregoing specifications as indicating the scope of the invention.

I claim:

1. A biofilter system comprising;
    a floor composed of a plurality of elongated polyhedron shaped planks laid side by side each having a generally trapezoidal cross-sectional configuration the longer parallel side of which lies in the plane of the floor and said planks being spaced from each other to form a plurality of slits approximately 1/16 inch in width running the length of the plank; an air plenum underlying said floor communicating with the openings formed between adjacent planks; biofilter media disposed on said floor;

and means for automatically and periodically turning the biofilter media.

2. A biofilter system as set forth in claim 1 including means enclosing both said biofilter and said turning means and including valve means for releasing to the atmosphere gases emanating from the biofilter.

3. A biofilter system as set forth in claim 1 including a wind machine for dispersing gases emanating from the biofilter into the upper atmosphere.

4. A method of deodorizing gases which comprises: placing filtering media on an aeration floor comprised of a series of elongated elements of trapezoidal cross-section the longer parallel sides of which form the aeration floor; placing said elements in side-by-side relation; forming a series of narrow, longitudinally extending, slits between adjacent floor elements; providing plenums underlying said floor in communication with said slits; and providing means for drawing gases into said plenum and forcing said gases through said slits and filtering media.

5. The method of claim 4 including the step of collecting within said plenum leachate runoff from the filtering media; incubating within the plenum the microbial content of the leachate and reinoculating the filtering media with incubated microbial culture.

6. A method of curing compost which comprises stacking compost to be cured on an aeration floor comprised of a series of elongated elements of trapezoidal cross-section the longer parallel sides of which form the aeration floor; placing said elements in side-by-side relation; forming a series of longitudinally extending narrow slits between adjacent floor elements; providing a plenum underlying said aeration floor communicating with said slits; providing means for delivering air to said plenum for distribution through said slits and overlying compost; collecting in said plenum leachate runoff from compost being cured; incubating within the plenum the microbial content of the leachate; and inoculating the compost undergoing curing with incubated microbial culture.

* * * * *

Disclaimer 5,700,687—Larry J. Finn, Gladewater, Texas. ODOR CONTROL SYSTEM. Patent dated December 23, 1997. Disclaimer filed May 22, 1998, by the assignee, Bedminster Bioconversion Corporation.

Hereby enters this disclaimer to claim 6 of said patent.

*(Official Gazette, July 14, 1998)*